United States Patent [19]

Vida

[11] 3,920,656

[45] Nov. 18, 1975

[54] METHOD OF MAKING BARBITURIC ACID COMPOUNDS

[75] Inventor: Julius A. Vida, Boston, Mass.

[73] Assignee: The Kendall Company, Walpole, Mass.

[22] Filed: June 11, 1973

[21] Appl. No.: 368,481

Related U.S. Application Data

[63] Continuation-in-part of Ser. Nos. 773,967, Nov. 6, 1968, abandoned, and Ser. No. 1,894, Jan. 9, 1970, abandoned, which is a continuation-in-part of Ser. No. 796,606, Feb. 4, 1969, abandoned.

[52] U.S. Cl. .................................. 260/257; 260/257
[51] Int. Cl.² ........................................ C07D 239/62
[58] Field of Search ..................................... 260/257

[56] References Cited
UNITED STATES PATENTS

| | | | |
|---|---|---|---|
| 2,344,459 | 3/1944 | Henze | 260/257 |
| 2,953,566 | 9/1960 | Sommers | 260/257 |

OTHER PUBLICATIONS

Wagner, et al., Synthetic Organic Chemistry, John Wiley & Sons, N.Y. 1953. (Section 452, pp. 679–680 and Section 358, p. 572).

*Primary Examiner*—Donald G. Daus
*Assistant Examiner*—Anne Marie T. Tighe

[57] ABSTRACT

A method of making N,N'-dialkoxyalkyl or N,N'-dibenzyloxyalkyl 5,5-disubstituted barbituric acid compounds by mixing 5,5-disubstituted barbituric acid with sodium hydride, potassium hydride, lithium hydride, potassium tertiary butoxide, lithium hydroxide or mixtures of any two or more, and with an inert solvent for the acid, the molar amount of the alkaline material being at least about twice that of the 5,5-disubstituted barbituric acid, and subsequently mixing with the reaction mixture a haloalkyl alkyl ether in a molar amount at least about twice that of the 5,5-disubstituted barbituric acid.

Method of making N,N'-dialkoxyalkyl phenobarbital by reacting with the monopotassium or monolithium salt of phenobarbital a haloalkyl alkyl ether, then converting the resulting phenobarbital by product to the monopotassium or monolithium salt and reacting with further haloalkyl alkyl ether.

9 Claims, No Drawings

METHOD OF MAKING BARBITURIC ACID COMPOUNDS

This application is a continuation-in-part of copending applications Ser. No. 773,967 filed Nov. 6, 1968 and Ser. No. 1,894 filed Jan. 9, 1970, the latter of which was in turn a continuation-in-part of application Ser. No. 796,606 filed Feb. 4, 1969, all now abandoned.

This invention relates to a method of making N,N'-dialkoxyalkyl and N,N'-dibenzyloxyalkyl 5,5-disubstituted barbituric acid compounds and pertains more specifically to an improved method for making such materials by reacting 5,5-disubstituted barbituric acids with certain alkaline materials to form a di-salt, then with a haloalkyl alkyl or haloalkyl benzyl ether, and to a method of making N,N'-dialkoxyalkyl phenobarbital, more specifically to an improved method for making this material by reacting haloalkyl alkyl ethers with certain salts of phenobarbital.

It is conventional to make N,N'-dialkoxyalkyl phenobarbital by reacting a haloalkyl alkyl ether with the mono-sodium salt of phenobarbital in a polar solvent. However, even when an excess of the ether is employed, the nature of the reaction is such that only half of the phenobarbital salt at most is converted into the desired product, the remaining half being converted into free phenobarbital in accordance with the following equation:

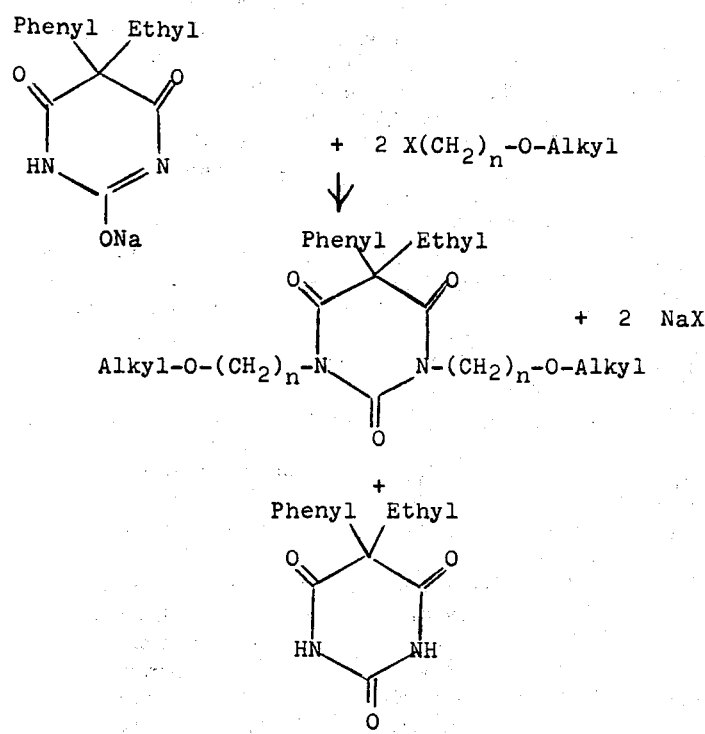

where X represents a halogen atom and $n$ is an integer. It is desirable to maximize the yield of N,N'-dialkoxyalkyl phenobarbital with respect to phenobarbital or phenobarbital sodium starting material because of the relatively high cost of the latter compounds as compared to the cost of the remaining reactants. However, use of an excess of alkali in the reaction mixture does not provide an improved yield of the desired product but instead reacts preferentially with the ether when the latter is added. Attempts to convert the free phenobarbital formed during the reaction into the corresponding sodium salt, by adding an alkaline sodium compound to the reaction mixture after completion of the initial reaction, are ineffective, apparently because the solubility of the sodium salt is insufficient, and the heating required to convert phenobarbital into the sodium salt of phenobarbital also causes decomposition of the N,N'-dialkoxyalkyl phenobarbital previously formed which is also present in the reaction mixture.

It has now been found that it is possible to obtain a much higher yield of N,N'-dialkoxyalkyl or N,N'-dibenzyloxyalkyl 5,5-disubstituted barbituric acid compounds by reacting the 5,5-disubstituted barbituric acid compound (hereinafter termed "barbituric starting material") with two molar proportions of certain alkaline materials to form a di-salt in the reaction mixture, then reacting it with two molar proportions of a haloalkyl alkyl or of a haloalkyl benzyl ether.

It is possible by the foregoing process of the present invention to obtain a yield of the desired product upwardly of 80% of the amount theoretically possible based on the amount of barbituric starting material employed, whereas at most only 50% yield of the desired product can be obtained by the conventional reaction starting with the monosodium salt of the barbituric starting material, as pointed out above.

The alkaline materials which may be employed to react with the barbituric starting material in the process of the present invention include sodium hydride, lithium hydride, potassium hydride, potassium tertiary butoxide, and lithium hydroxide, as well as mixtures of two or more of such materials. Of these alkaline materials the hydrides are preferred because the by-product of the reaction in that case is hydrogen gas which readily escapes from the reaction mixture, causing the reaction to proceed to completion very rapidly and facilitating purification of the product.

The process of the present invention is carried out by mixing the barbituric starting material with the desired alkaline material and with a suitable solvent for the barbituric starting material to form a reaction mixture containing the disalt. It is preferred to dissolve the barbituric starting material in the solvent, then mix the alkaline material with the solution. Although various non-aqueous organic solvents may be employed, including benzene, toluene, acetonitrile, butadiene sulfone, and hexamethyl phosphoramide, it is preferred to use polar solvents having a high dielectric constant, such as dimethyl formamide, dimethyl acetamide, dimethyl sulfoxide, N-methyl pyrrolidone, bis (2-methoxyethyl) ether, or the like including mixtures of two or more. It is desirable, of course, that the solvent be inert not only to the barbituric starting material and to the alkaline materials employed in the process, but also to the haloalkyl alkyl or haloalkyl benzyl ether and to the product formed during the course of the process. Particularly preferred are dimethyl formamide, dimethyl acetamide, and dimethyl sulfoxide.

In order to form the di-salt of the barbituric starting material, it is essential, of course, that at least about two molar proportions of alkaline material be employed for each molar proportion of the barbituric starting material. It is desirable to employ a slight excess of the alkaline material up to about 10% by weight above the two molar amounts theoretically required for the reaction in order to be sure of utilizing completely of all of the relatively expensive barbituric starting material present, but the use of a large excess of alkaline material, while having no adverse reaction upon the course of the process, is wasteful and economically undesirable.

The relative proportions of solvent and of barbituric starting material are not critical and can be varied over a wide range. It is desirable from an economic standpoint to employ as little solvent as reasonably required, both to avoid the cost of unnecessary solvent and to minimize the cost of recovering the desired product from the reaction mixture. In general, the concentration of the barbituric starting material may vary from 5 to 10% or even more by weight of the solvent. The solution of barbituric starting material and of alkaline material may be heated to a moderate temperature in order to accelerate formation of the di-salt, but it is desirable to avoid heating above about 120°C. or for longer than 30 minutes at that temperature, particularly after the haloalkyl alkyl or haloalkyl benzyl ether has been introduced into the reaction mixture and when there is present in the reaction mixture some N,N'-dialkoxyalkyl or N,N'-dibenzyloxyalkyl product.

The haloalkyl alkyl or haloalkyl benzyl ether which is mixed with the reaction mixture containing the di-salt of the barbituric starting material is employed in a molar proportion which is at least approximately twice that of the di-salt. A substantial excess of the amount of ether above the two molar proportions required is usually wasteful. However, when lithium hydroxide or potassium tertiary butoxide is employed as the alkaline material in the first stage of the process, water or tertiary butyl alcohol is produced as by-product in equimolar proportions, and since the ether reacts to some extent with this water or tertiary butyl alcohol, as well as with the di-salt, it is important to use an excess of ether in the second stage of the reaction in order to compensate for the amount which is lost by reaction with the water or tertiary butyl alcohol. The barbituric starting materials which may be used in the process include compounds having the formula

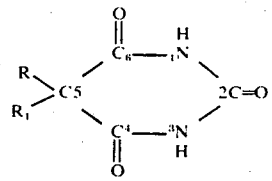

wherein R and $R_1$ are phenyl and ethyl respectively, or R and $R_1$ are individually alkyl or alkenyl each having 2 to 5 carbon atoms or cycloalkenyl having 5 to 7 carbon atoms; among such compounds are barbital, phenobarbital, probarbital, aprobarbital, amobarbital, allobarbital, vinbarbital, pentobarbital, cyclobarbital, 5-allyl-5-(2-cyclopentenyl) barbituric acid, 5-ethyl-5-cycloheptenyl barbituric acid, etc.

While a wide variety of haloalkyl alkyl or haloalkyl benzyl ethers may be employed in which the alkyl groups may contain from 1 to 12 carbon atoms and the haloalkyl group may be for example chloroalkyl, bromoalkyl, or iodoalkyl, including 1-haloethyl, 2-halo-n-butyl, ε-halo-n-octyl, etc., it is preferred to employ chloromethyl benzyl ether or chloromethyl alkyl ethers in which the alkyl group contains from 1 to 12 carbon atoms such as chloromethyl methyl ether, chloromethyl ethyl ether, chloromethyl n-butyl ether, chloromethyl isobutyl ether, chloromethyl 2-ethyl hexyl ether, chloromethyl n-decyl ether, chloromethyl n-lauryl ether, and the like.

The temperature of the reaction mixture during the second stage of the process, i.e., during and after the introduction of the ether may vary over a considerable range and may be the same as or different from the temperature during the first stage of the process, but it is desirable to avoid temperatures above about 120°C. in order to avoid or to minimize decomposition of the resulting N,N'-dialkoxyalkyl compound desired as the product. In general, it is preferred that the reaction mixture be maintained at a temperature from about 0° to 120°C. during the reaction with the ether, still more preferably from about room temperature (20°C.) to 55°C.

While the reactions occurring during each stage of the process, that is the formation of the di-salt and the reaction of the ether therewith, are quite rapid, particularly when carried out at elevated temperature as set forth above, it is desirable as a practical matter to stir the reaction mixture for a period of time of the order of 5 to 10 minutes or more during each stage in order to ensure completion. The precise minimum time required for completion varies depending upon the exact temperature at which the process is carried out, and the identity of the solvent and of the alkaline material and ether which are employed. In order to ensure that the reactions occurring during each stage of the process are complete or substantially complete, it is desirable to allow approximately 60 minutes for each stage, but longer times may be employed.

The pressure on the reaction mixture during the course of each stage of the process is not critical. When a hydride is employed as an alkaline material, so that gaseous hydrogen is produced as a by-product, it is desirable to avoid elevated pressure in order to facilitate removal of the hydrogen from the reaction mixture. When a volatile reactant such as chloromethyl methyl ether is employed and the reaction mixture is heated at a temperature above the boiling point of that reactant, a superatmospheric pressure may be desirable to prevent loss of the volatile reactant. In general, autogenous or atmospheric pressure at the particular temperature selected is convenient and satisfactory.

The desired product after completion of the last stage of the process may be separated from the reaction mixture by diluting the latter with water, for example, by drowning the reaction mixture in ice water, whereupon the desired product separates as a precipitate which can then be removed by filtration and purified by conventional procedures. The products are useful as anticonvulsant agents as set forth in the copending application of Samour Ser. No. 749,972, now abandoned It is also possible to obtain much higher yield of N,N'-dialkoxyalkyl phenobarbital by a second process, that of reacting the monolithium or monopotassium salt of phenobarbital instead of the monosodium salt in solution with a haloalkyl alkyl ether to form a mixture containing N,N'-dialkoxyalkyl phenobarbital and free phenobarbital, subsequently adding to the mixture an alkaline potassium or lithium compound to convert the free phenobarbital formed during the first reaction to the corresponding potassium or lithium salt in solution, and thereafter adding a further quantity of the ether to the solution to convert the newly formed potassium or lithium salt of phenobarbital into a mixture containing N,N'-dialkoxyalkyl phenobarbital and free phenobarbital. The steps of adding an alkaline potassium or lithium compound and of adding further ether may be repeated as many times as desired, after which the desired N,N'-dialkoxyalkyl phenobarbital may be separated from the reaction mixture and purified in the usual manner.

The latter process of the present invention makes it possible to obtain amounts of N,N'-dialkoxyalkyl phenobarbital substantially in excess of the 50% (based on the amount of phenobarbital or phenobarbital salt originally employed) which is the optimum conversion realizable in a single stage reaction starting from the commercially available monosodium salt of phenobarbital.

The latter process of the present invention may be carried out by preparing a solution of the monopotassium or monolithium salt of phenobarbital in a suitable non-aqueous polar solvent; if desired, the solution may be prepared by mixing phenobarbital with a suitable alkaline compound of potassium or lithium in the desired solvent so as to form the salt in situ. While a variety of polar solvents may be employed, it is desirable to use those having a high dielectric constant, such as dimethyl formamide, dimethyl acetamide, dimethyl sulfoxide, N-methyl pyrrolidone, bis (2-methoxyethyl) ether, or the like. The solvent should be inert not only to phenobarbital and to the alkaline potassium or lithium compound but also to the other reactants, i.e., the phenobarbital salt and the haloalkyl alkyl ether, as well as to the N,N'-dialkoxyalkyl phenobarbital product.

When the potassium or lithium salt of phenobarbital is formed in situ, any of a wide variety of alkaline compounds of potassium or lithium may be used to react with the phenobarbital, among which are oxides, hydroxides, alkoxides, and salts of weak acids, i.e., acids having a dissociation constant smaller than that of phenobarbital. Suitable compounds include potassium oxide, lithium oxide, potassium hydroxide, lithium hydroxide, potassium methoxide, lithium carbonate, potassium tertiary butoxide, and the like.

The relative proportions of solvent and of phenobarbital salt in the second process are not critical and can be varied over a wide range. It is desirable from an economic standpoint to employ as little solvent as reasonably possible, both to avoid the cost of unnecessary solvent and to minimize the cost of recovering the desired product from the reaction mixture. In general, the concentration of monopotassium or monolithium salt of phenobarbital may range from 5 to 10% or even more by weight of the solvent. When the salt is prepared in situ by mixing finely-divided phenobarbital with the polar solvent and reacting it with an alkaline potassium or lithium compound, the amount of such alkaline compound should be at least approximately equivalent to the amount of phenobarbital. The mixture of phenobarbital and alkaline compound may be heated to a moderate temperature in order to accelerate formation of the salt, but it is desirable to avoid heating above about 120°C. or for longer than 30 minutes at that temperature, particularly in the second or subsequent stage of the process when there is present in the reaction mixture some N,N'-dialkoxyalkyl phenobarbital.

The haloalkyl alkyl ether which is mixed with the solution of the phenobarbital salt in the second process is preferably employed in an amount which is at least approximately equal, on a molar basis, to the amount of phenobarbital salt. A substantial excess of the amount of ether over an equimolar quantity is wasteful because it remains available in the reaction mixture to react with the alkaline compound which is added in subsequent stages, thus interfering with the formation of phenobarbital salt from the free phenobarbital produced in the first stage reaction. However, in those cases where the phenobarbital salt is formed in situ from a compound such as potassium or lithium hydroxide which also produces a mole of water it is important to use an excess of ether in order to compensate for the amount which is lost by reaction with the water present.

While a wide variety of haloalkyl alkyl ethers may be employed in the second process in which the alkyl groups may contain from 1 to 12 carbon atoms and the haloalkyl group may be chloroalkyl, bromalkyl, iodoalkyl, etc., it is preferred to employ chloromethyl alkyl ethers in which the alkyl group contains from 1 to 12 carbon atoms such as chloromethyl methyl ether, chloromethyl ethyl ether, chloromethyl n-butyl ether, chloromethyl isobutyl ether, chloromethyl 2-ethyl hexyl ether, chloromethyl n-decyl ether, chloromethyl n-lauryl ether, and the like.

The temperature at which the ether is mixed with the phenobarbital salt solution in the second process may vary over a considerable range, but it is desirable to avoid temperatures above about 120°C. in order to avoid or minimize decomposition of the resulting N,N'-dialkoxyalkyl phenobarbarital. In general, it is preferred that the reaction mixture be maintained at a temperature from about 0° to 120°C. during the reaction with the ether, still more preferably from about room temperature (20°C.) to 55°C.

While each of the reactions in the second process, that is the formation of the phenobarbital salt and the reaction of the ether therewith, is fairly rapid when carried out near the upper limit of the preferred temperature ranges set forth above, an appreciable time period is required for completion of the reaction, of the order of 5 to 10 minutes or more, the precise time varying depending upon the exact temperature at which the reaction is carried out, the identity of the solvent and of the alkaline compound and ether which are employed. In order to insure that each reaction is complete or substantially complete in each stage of the process, it is desirable to allow approximately 60 minutes for each such reaction to occur, but longer times may be employed if necessary.

The pressure on the reaction mixture in the second process during the course of the reaction is not critical; when a volatile reactant such as chloromethyl methyl ether is employed and the reaction is carried out at a temperature above its boiling point a superatmospheric pressure may be desirable to prevent loss of the volatile reactant; in genreral, autogenous pressure at the particular temperature selected is desirable.

The desired product after completion of the last stage of the second process may be separated from the reaction mixture by diluting the latter with water, for example by drowning the reaction mixture in ice water, whereupon the desired product separates as a precipitate, which can then be removed by filtration and purified by conventional procedures.

In order to illustrate more fully the nature of the present invention without imposing any limitation upon the scope thereof, the following specific examples are given.

EXAMPLE 1

There was dissolved by stirring in 250 ml. of dimethyl formamide 23.2 g. of phenobarbital (0.10 mole). To this solution was added rapidly 9.00 g. of a mineral oil dispersion containing 5.04 g. of sodium hydride (0.21 mole). A large amount of heat was evolved and the flask was cooled in a waterbath at 35°C. Fifteen minutes after the addition of the sodium hydride, the introduction of chloromethyl methyl ether was begun and continued over a period of about 10 minutes. A total of 17.5 g. of the ether (0.22 mole) was introduced, after which the reaction mixture was stirred for 2 hours at room temperature, then poured into 1300 g. of a mixture of ice and water and stirred for another period of 2 hours. The white solid precipitate which appeared was removed by filtration, then dissolved in 150 ml. of hot ethyl alcohol. To the boiling solution 1 gram of activated carbon was added and the boiling solution was filtered through a Buchner funnel which contained a compacted layer of finely-divided diatomaceous silica. After cooling to room temperature overnight, the crystals which appeared in the form of colorless needles were separated by filtration and washed twice with 30 ml. portions of ethyl alcohol. Additional crystalline product was recovered from the mother liquor by evaporation and recrystallization from ethyl alcohol.

The total yield of N,N'-dimethoxymethyl phenobarbital was 26.2 g., m.p. 116°–118°C., representing 82% of the amount theoretically possible based upon the amount of phenobarbital employed.

EXAMPLE 2

There was dissolved in 250 ml. of dimethyl formamide 23.2 g. of phenobarbital (0.10 mole). Into this solution there was stirred rapidly 1.6 g. of lithium hydride (0.20 mole). A considerable amount of heat was evolved and the reaction flask was cooled in an ice bath with stirring for about an hour. Introduction of chloromethyl methl ether was then begun and continued over a period of about 15 minutes, a total of 17.5 g. of the ether (0.22 mole) being introduced. After the reaction mixture had been stirred for about an hour, it was poured into 1200 g. of a mixture of ice and water and stirred for a further period of 2 hours after which the solid precipitate was separated by filtration, dissolved in approximately 180 ml. of boiling aqueous ethyl alcohol containing 20% water and crystallized as described in Example 1. The total yield of N,N'-dimethoxymethyl phenobarbital was 27.8 g., m.p. 116°–118°C., equal to 86.5% of the amount theoretically possible based upon the amount of phenobarbital employed.

EXAMPLE 3

The procedure described in Example 1 was repeated except that there was substituted for the sodium hydride oil dispersion 24.6 g. of an oil dispersion containing 8.4 g. of potassium hydride (0.21 mole). The reaction mixture was stirred for an hour instead for 15 minutes before the introduction of chloromethyl methyl ether was begun, and the introduction of the ether extended over a period of 30 minutes instead for 10 minutes. Stirring of the reaction mixture was continued for an hour after introduction of the ether was complete, whereupon the mixture was poured into 1200 g. of a mixture of ice and water and stirred for a further period of 2 hours. The solid precipitate was separated by filtration and recrystallized as described in Example 1. The total yield of N,N'-dimethoxymethyl phenobarbital was 25.7 g. of material having a melting point of 116°–118°C., representing a yield of 80% of the theoretical amount based upon the amount of phenobarbital used.

EXAMPLE 4

There was prepared a solution containing 23 g. of phenobarbital (0.1 mole) in 250 ml. of dimethyl formamide. To this solution there was added with stirring 22.4 g. of potassium tertiary butoxide (0.2 mole) and the reaction mixture was stirred for about an hour. At the end of this time, 50 g. of chloromethyl methyl ether (0.625 mole) was slowly stirred into the reaction mixture and the resulting solution was stirred for about an hour then poured into 1000 g. of a mixture of ice and water, after which it was stirred for an additional 1-hour period. The solid precipitate was separated by filtration and crystallized from 250 ml. of hot ethanol by the procedure of Example 1. The product N,N'-dimethoxymethyl phenobarbital was obtained in the amount of 20 g., representing a yield of 62.5% of the theoretical based on the amount of phenobarbital employed.

EXAMPLE 5

The procedure of Example 4 was repeated except that the potassium tertiary butoxide was replaced with 4.8 g. of lithium hydroxide (0.2 mole).

There was obtained 18 g. of N,N'-dimethoxymethyl phenobarbital, representing a yield of 56% of the theoretical based on the amount of phenobarbital employed.

EXAMPLE 6

There was dissolved in 20 ml. of dimethylformamide 1.84 g. of barbital (0.01 mole). To this solution was added 176 mg. of lithium hydride (0.022 mole) and the mixture was stirred for 20 minutes. A total amount of 5.1 g. of chloromethyl-n-dodecyl ether (0.0218 mole) was added gradually, after which the reaction mixture was warmed to 100°C. and stirred for 30 minutes. The reaction mixture was allowed to cool to room temperature overnight and then poured into 300 ml. of a mixture of ice and water. The mixture was extracted into ethyl acetate, washed with water, dried and the extract evaporated to a small volume under reduced pressure. Chromatography of the product was performed on silica gel; elution with an ethyl acetate-benzene mixture provided 3.2 g. of oil. Thin layer chromatograms and infrared spectra for the product were identical to those of an analytical sample of 1,3-di-n-dodecyloxymethyl-5,5-diethyl barbituric acid.

EXAMPLE 7

Following the procedure of Example 6, 176 mg. of lithium hydride (0.022 mole) was added to a solution of 2.38 g. of secobarbital (0.01 mole) in 25 ml. of dimethylformamide. After stirring at room temperature for 30 minutes, 3.5 g. of chloromethylbenzyl ether (0.022 mole) was added gradually. The reaction mixture was stirred overnight and then poured onto ice; an oily product was extracted into ethyl acetate, washed, dried and evaporated to a small volume under reduced pressure. Separation, as described in the preceding example, provided 3.8 g. of oil; thin layer chromatograms and infrared spectra for this oil were identical to those of an analytical sample of 1,3-dibenzyloxymethyl-5-allyl-5-(2-pentyl) barbituric acid.

Similar results are achieved employed other ethers and other barbituric starting materials within the scope of the invention.

EXAMPLE 8

Phenobarbital (23.2 g.) was dissolved in 250 ml. of dimethylformamide. To the solution was added 11.2 g. of potassium tertiary butoxide and the suspension was heated to 110°C., at which temperature all solid had dissolved. The solution was cooled to 50° and 8 g. of chloromethylmethylether was added, and the mixture was stirred for 1 hour. To the suspension another 11.2 g. portion of potassium tertiary butoxide was then added and the mixture was heated to 100°. The reaction mixture was again cooled to 50°, then another 16 g. portion of chloromethylmethylether was added. The mixture was stirred for 1 hour, then poured into 1 liter of ice water, stirred for another hour, then filtered and washed on the filter with water. There were obtained 35 g. of wet crude compound which was dissolved in 150 ml. of hot ethyl alcohol. To the boiling solution 1 g. of activated carbon was added and the boiling solution was filtered through a Buchner funnel which contained a compacted layer of finely-divided diatomaceous silica. The cake was washed three times with 10 ml. portions of ethanol, then 75 ml. of hot water was added to the alcoholic solution. The hot aqueous ethanolic solution was allowed to cool to room temperature, and the resulting crystals were filtered, washed three times with 20 ml. portions of 50% aqueous ethyl alcohol and dried in a vacuum desiccator. There were obtained 20 g. of N,N'-dimethoxymethyl phenobarbital, m.p. 116°–118°C. representing a yield of 63.5% of the theoretical.

EXAMPLE 9

Phenobarbital (23 g.) was dissolved in 150 ml. of dimethylformamide. To the solution 2.4 g. of lithium hydroxide was added and the mixture was stirred at room temperature (ca. 20°C.) to dissolve all of the solid, after which 8 g. of chloromethylmethylether was added and the mixture was stirred for 1 hour, all at room temperature. To the suspension another 2.4 g. portion of lithium hydroxide was added and the mixture was stirred for 30 minutes, after which another 16 g. portion of chloromethylmethylether was added and the mixture was again stirred for 1 hour, all at room temperature. The reaction mixture was then poured into 600 g. of ice water and the mixture was stirred for 1 hour. The product was removed by filtration and washed on the filter with water. There were obtained 40 g. of crude wet product which was dissolved in 150 ml. of hot ethyl alcohol. To the boiling solution 1 g. of activated carbon was added, and the boiling solution was filtered through a Buchner funnel which contained a compacted layer of finely-divided diatomaceous silica. The cake was washed three times with 10 ml. of ethanol then 75 ml. of hot water was added to the alcoholic solution and the hot aqueous alcoholic solution was allowed to cool to room temperature. The resulting crystals were filtered from the aqueous alcohol, washed three times with 20 ml. portions of 50% aqueous ethyl alcohol and dried in a vacuum desiccator. There were obtained 21.0 g. of N,N'-dimethoxymethyl phenobarbital, m.p. 116°–118°, representing a yield of 66% of the theoretical.

What is claimed is:

1. The method of making N,N'-dialkoxyalkyl or N,N'-dibenzyloxyalkyl 5,5-disubstituted barbituric acid compounds which consists essentially of mixing (1) a barbituric starting material having the formula

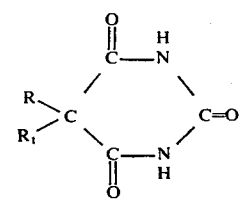

wherein R and $R_1$ are phenyl and ethyl respectively, or R and $R_1$ are individually alkyl or alkenyl each having 2 to 5 carbon atoms or cycloalkenyl having 5 to 7 carbon atoms with (2) an alkaline material selected from the group consisting of sodium hydride, potassium hydride, lithium hydride, and potassium tertiary butoxide, in (3) a non-aqueous solvent for said starting material inert to said materials to form a reaction mixture, the molar amount of said alkaline material being at least twice that of the barbituric starting material, and subsequently mixing with said reaction mixture a haloalkyl alkyl ether or a haloalkyl benzyl ether in a molar amount at least twice that of the barbituric starting material.

2. The method as claimed in claim 1 in which the alkaline material is a hydride.

3. The method as claimed in claim 2 in which the solvent is selected from the group consisting of dimethyl formamide, dimethyl acetamide, and dimethyl sulfoxide.

4. The method as claimed in claim 2 in which the ether is a chloromethyl alkyl ether in which the alkyl group contains from 1 to 12 carbon atoms.

5. The method as claimed in claim 4 in which the alkaline material is sodium hydride and the ether is chloromethyl methyl ether.

6. The method of making N,N'-dialkoxyalkyl phenobarbital which consists essentially of mixing with a member of the group consisting of monopotassium and monolithium salts of phenobarbital in solution in an inert solvent an at least equimolar first amount of haloalkyl alkyl ether to form a mixture containing N,N'-dialkoxyalkyl phenobarbital and free phenobarbital, and subsequently adding to the last said mixture a quantity of an alkaline potassium or lithium compound soluble in said solvent to convert said free phenobarbital to a member of the group consisting of monopotassium and monolithium salts of phenobarbital in solution, said alkaline potassium or lithium compound being selected from the group consisting of potassium oxide, lithium oxide, potassium hydroxide, lithium hydroxide, potassium methoxide and potassium tertiary butoxide and thereafter adding to the last said solution a further quantity of said ether, the molar amount of said further quantity of ether being at least equal to the molar amount of said phenobarbital salt.

7. The method as claimed in claim 6 in which said solvent is selected from the group consisting of dimethyl formamide, dimethyl acetamide, and dimethyl sulfoxide.

8. The method as claimed in claim 6 in which said ether is a chloromethyl alkyl ether in which said alkyl group contains from 1 to 12 carbon atoms.

9. The method as claimed in claim 7 in which the salt of phenobarbital is the potassium salt, the haloalkyl alkyl ether is chloromethyl methyl ether, and the alkaline compound is potassium tertiary butoxide.

* * * * *